United States Patent
Stieff et al.

(10) Patent No.: US 10,996,314 B2
(45) Date of Patent: May 4, 2021

(54) METHOD AND APPARATUS FOR ALIGNMENT OF VEHICLE BLIND SPOT MONITORING SENSOR (71) Applicant: Hunter Engineering Company, St. Louis, MO (US)

(72) Inventors: Michael T. Stieff, Wentzville, MO (US); Patrick G. J. Callanan, St. Louis, MO (US)

(73) Assignee: HUNTER ENGINEERING COMPANY, St. Louis, MO (US)

(*) Notice: Subject to any disclaimer, the term of this patent is extended or adjusted under 35 U.S.C. 154(b) by 518 days.

(21) Appl. No.: 15/546,800

(22) PCT Filed: Feb. 16, 2016

(86) PCT No.: PCT/US2016/018022
§ 371 (c)(1),
(2) Date: Jul. 27, 2017

(87) PCT Pub. No.: WO2016/133875
PCT Pub. Date: Aug. 25, 2016

(65) Prior Publication Data
US 2018/0052223 A1 Feb. 22, 2018

Related U.S. Application Data (60) Provisional application No. 62/117,274, filed on Feb. 17, 2015.

(51) Int. Cl.
*G01S 7/40* (2006.01)
*G01B 11/27* (2006.01)
(Continued)

(52) U.S. Cl.
CPC .......... *G01S 7/4026* (2013.01); *G01B 11/026* (2013.01); *G01B 11/14* (2013.01);
(Continued)

(58) Field of Classification Search
CPC .... G01S 7/4026; G01S 7/4972; G01S 13/931; G01S 17/933; G01S 2013/9332; G01S 2013/9367; G01B 11/14; G01B 11/27
See application file for complete search history.

(56) References Cited

U.S. PATENT DOCUMENTS

2004/0133376 A1    7/2004  Uffenkamp et al.
2008/0147274 A1*   6/2008  Ko ......................... G01S 17/87
                                                         701/41
(Continued)

FOREIGN PATENT DOCUMENTS

WO        2008/130385 A1    10/2008

OTHER PUBLICATIONS

International Search Report for corresponding PCT/US2016/018022 dated Jun. 30, 2016.
(Continued)

*Primary Examiner* — Erin F Heard
*Assistant Examiner* — Donald H B Braswell
(74) *Attorney, Agent, or Firm* — Sandberg Phoenix & von Gontard, P C.

(57) ABSTRACT

A procedure for calibrating a vehicle onboard sensor 202 by facilitating the placement of a calibration fixture 110 on a floor relative to a stationary vehicle 100 using a laser emitter 102 secured to a front steerable wheel 104 of the vehicle on the same lateral side as the vehicle onboard sensor. A beam projection axis X of the laser projector is aligned at a known orientation relative to a geometric characteristic of the vehicle 100, such that the beam projection axis X is directed over a placement location P of the calibration fixture on the floor, either inherently or by guided steering of the supporting steerable wheel. A distance between the calibration fixture 110 and a reference point associated with the vehicle 100 is measured, and a current position of the calibration
(Continued)

fixture on the floor along the beam projection axis X is adjusted as required to position the calibration fixture for calibration of the vehicle sensor 202 at a selected distance from the reference point along the beam projection axis X.

10 Claims, 7 Drawing Sheets

(51) Int. Cl.
    *G01B 11/02*     (2006.01)
    *G01S 7/497*     (2006.01)
    *G01S 13/931*     (2020.01)
    *G05D 1/02*     (2020.01)
    *G01B 11/14*     (2006.01)
    *G01S 17/933*     (2020.01)

(52) U.S. Cl.
    CPC ............ *G01B 11/27* (2013.01); *G01S 7/4972* (2013.01); *G05D 1/0231* (2013.01); *G05D 1/0257* (2013.01); *G01B 2210/12* (2013.01); *G01S 13/931* (2013.01); *G01S 17/933* (2013.01); *G01S 2013/9315* (2020.01); *G01S 2013/9323* (2020.01)

(56) References Cited

U.S. PATENT DOCUMENTS

| | | | | |
|---|---|---|---|---|
| 2013/0110314 A1* | 5/2013 | Stieff | ................... | G01S 7/4026 701/1 |
| 2014/0098229 A1 | 4/2014 | Lu et al. | | |
| 2014/0233023 A1 | 8/2014 | Soinnen et al. | | |
| 2014/0259707 A1* | 9/2014 | Jones | ................... | G01S 7/4026 33/228 |
| 2015/0070491 A1* | 3/2015 | Rogers | ............... | G01B 11/2755 348/135 |
| 2017/0016716 A1* | 1/2017 | Fiess | ................. | G01B 11/2755 |

OTHER PUBLICATIONS

Written Opinion for corresponding PCT/US2016/018022 dated Jun. 30, 2016.

* cited by examiner

METHOD AND APPARATUS FOR ALIGNMENT OF VEHICLE BLIND SPOT MONITORING SENSOR

RELATED APPLICATIONS

The present application is the US National Stage application under 35 U.S.C. §371 of International App. No. PCT/US2016/018022 filed Feb. 16, 2016 which is related to, and claims priority from, U.S. Provisional Patent Application Ser. No. 62/117,274 filed on Feb. 17, 2015, both of which are incorporated herein by reference.

STATEMENT REGARDING FEDERALLY SPONSORED RESEARCH

Not Applicable.

BACKGROUND OF THE INVENTION

The present application is related generally to method and apparatus used to facilitate the proper alignment of vehicle onboard sensors for monitoring the environment around the vehicle, such as blind spot monitoring radar, lane departure warning sensors, and cross-traffic warning sensors, and in particular to method and apparatus for guiding placement of sensor alignment equipment in proximity to the vehicle and relative to the vehicle onboard sensors during a reset or calibration procedure.

Modern vehicles are becoming increasingly sophisticated with the addition of various sensors and systems configured to monitor the external environment around the vehicle. A wide variety of vehicle onboard sensors, including acoustic, optical, infrared, and radar are employed by onboard vehicle systems such as backup alarms, collision avoidance systems, brake assist system, lane departure warning systems, cross-traffic warning systems, park assist systems, and blind spot monitoring systems. In extreme vehicle applications, data acquired by multiple systems is integrated together to enable autonomous driving of the vehicle under a variety of environmental conditions. In order for these various systems to function properly, it is necessary to ensure that the vehicle onboard sensors which acquire data regarding objects in the environment surrounding the vehicle are aligned to specific predetermined or known orientations relative to the vehicle. If a sensor is misaligned, the resulting data acquired from that vehicle onboard sensor may not properly detect the presence of an object adjacent to or approaching the vehicle, or may not properly identify the location of observed objects, leading to situations in which warnings are not provided, and corrective action not taken when they should have been, or situations in which warnings or corrective action are provided or taken in error. Failure of such an onboard vehicle system to properly detect and locate objects in the vicinity of the moving vehicle could lead to collisions between the vehicle and the object.

Accordingly, many automotive manufacturers have established specific requirements for alignment of the various vehicle onboard sensors which observe or monitor the vehicle external environment. These requirements often require the placement of observable or reflective calibration targets at precise locations relative to an identifiable or measured point on, or associated with, the vehicle or the vehicle onboard sensor itself. With a calibration target properly positioned, an vehicle onboard sensor can be aligned or calibrated with reference to the observable or reflective calibration target.

For example, many new vehicle models are equipped with Blind Spot Monitoring (BSM) systems. The BSM systems employ radar device concealed in inconspicuous locations, such as behind the vehicle rear bumper cover. Different versions of the radar device may be in various vehicle models, but multiple versions may share the same mounting bracket. In order to perform an aiming or calibration procedure for the radar devices, manufacturers generally require the vehicle be positioned on a level surface. A trihedral radar-reflective aiming or calibration target is placed at an offset distance of up to 8 meters diagonally from the rear corner of the vehicle housing the radar device undergoing aiming or calibration. This distance varies depending on the vehicle model and is commonly referenced to a feature of the vehicle, such as the location of the vehicle body centerline or a computed thrust line.

Recognizing the need to position the observable or reflective calibration targets in precise locations, it would be beneficial to provide vehicle service technicians with a simplified procedure and apparatus to ensure proper placement of the calibration targets relative to each vehicle undergoing a service or inspection procedure.

BRIEF SUMMARY OF THE INVENTION

Briefly stated, the present disclosure sets forth a procedure for aligning an vehicle onboard sensor by facilitating the placement of an observable target or calibration fixture relative to a stationary vehicle housing the sensor. Initially, a laser emitter or optical projector is operatively secured to a steerable front wheel assembly of the vehicle, on the same lateral side as the vehicle onboard sensor to be aligned. A beam projection axis of the laser emitter or optical projector is aligned to a known orientation relative to a geometric aspect of the vehicle, such that the beam projection axis is directed towards a manufacturer-specified placement location for the target or calibration fixture either inherently, or by guided steering of the steerable wheel assembly. The observable target or calibration fixture is then disposed on the projection axis of the laser projector, oriented towards the blind spot monitoring system sensor and within the field of view of the blind spot monitoring system sensor. A distance between a reference location associated with the vehicle and the observable target or calibration fixture is measured, and the placement of the observable target or calibration fixture along the beam projection axis is adjusted as required to position the observable target or calibration fixture at the selected distance from the reference location. With the observable target or calibration fixture properly positioned and appropriately orientated, the alignment of the vehicle onboard sensor is evaluated and adjusted according to the manufacturer's specifications while observing the target or calibration fixture.

In a further method of the present disclosure, a laser emitter or optical projector is operatively secured to a front steerable wheel assembly of the vehicle such that the beam projection axis is aligned at a known orientation, such as perpendicular to the wheel axis of rotation. A machine vision alignment system optical target is then secured in relationship to the front steerable wheel assembly in an observable field of view for a machine vision vehicle wheel alignment system. Observations of the optical target by the machine vision vehicle wheel alignment system are utilized to guide a steering movement of the front steerable wheel assembly to align the beam projection axis with a placement location for an observable target or calibration fixture associated with an vehicle onboard sensor. Optionally, the machine vision alignment system may be utilized to align the front steerable wheel assembly relative to a geometric line of the vehicle, such as the centerline or thrust line, prior to guiding the steering movement of the wheel assembly to align the beam projection axis.

In an alternate method of the present disclosure, a machine vision vehicle wheel alignment system is utilized to facilitate measurement and adjustment of an vehicle onboard sensor, such as a blind spot monitoring system sensor. Initially, an adapter for receiving an optical target is secured to the vehicle onboard sensor or an associated supporting bracket. An optical target is then secured to the adapter, such that the optical target is within a field of view of the machine vision vehicle wheel alignment system. The position and orientation of the optical target, and correspondingly the vehicle onboard sensor, are measured by the machine vision vehicle wheel alignment system, with reference to a known or measured feature of the vehicle, such as the vehicle centerline or vehicle thrust line. If necessary, corrections or adjustments to the vehicle onboard sensor are made to ensure it is at the proper position and orientation. Once the position and orientation of the vehicle onboard sensor are determined to be correct, the optical target orientation is altered, such that the optical target is visible from positions within a field of view of the vehicle onboard sensor. A portable sensor associated with the machine vision vehicle wheel alignment system is disposed within the field of view of the vehicle onboard sensor, enabling the machine vision vehicle wheel alignment system to obtain a measurement of the relative positions of the optical target and the portable sensor. Using the obtained measurement, the portable sensor is guided to a specified position within the vehicle onboard sensor field of view at which the vehicle manufacturer specifies placement of an observable target or calibration fixture for the vehicle onboard sensor. The resulting location is noted or marked, and the portable sensor replaced with the observable target or calibration fixture to complete a manufacturer specific calibration procedure for the vehicle onboard sensor.

The present disclosure further sets forth an apparatus configured to facilitate the proper positioning of an observable target or calibration fixture associated with the alignment or calibration of an vehicle onboard sensor, such as a vehicle blind spot monitoring system sensor. The apparatus consists of a laser emitter or optical projector adapted to be secured to a surface of the vehicle, such as a wheel assembly, in a fixed or determinable orientation, together with a distance measurement device configured to be coupled to the observable target or calibration fixture. The laser emitter or optical projector projects a beam of light defining a beam projection axis in proximity to the vehicle, along which the observable target or calibration fixture is to be disposed, within a field of view of the vehicle onboard sensor. The distance measurement device is configured to measure or indicate a distance between the observable target or calibration fixture and the vehicle onboard sensor or other established reference point, enabling identification of a manufacturer specified location for placement of the observable target or calibration fixture relative to the vehicle onboard sensor.

The foregoing features, and advantages set forth in the present disclosure as well as presently preferred embodiments will become more apparent from the reading of the following description in connection with the accompanying drawings.

BRIEF DESCRIPTION OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Procedures for facilitating, during a vehicle service procedure, the alignment and calibration of vehicle onboard sensors which monitor or observe the external environment surrounding the vehicle, such as radar or optical sensors used for blind spot monitoring, cross-traffic monitoring, lane departure warnings, collision avoidance systems, and automatic cruise control, are illustrated with reference to the accompanying illustrations and flow charts shown in the various Figures. It will be understood by those of ordinary skill in the art that these procedures are intended to be implemented while the vehicle is stationary and disposed on a level surface, such as within a service bay or shop environment in which precision measurements associated with the vehicle can be acquired. External access to the vehicle onboard sensors or to the mounting structures in which they are secured is often required, and may necessitate the removal of vehicle components such as bumper covers or access panels prior to beginning any alignment or calibration procedures, depending upon the vehicle manufacturer's guidelines and stated procedures.

In order to complete alignment or calibration procedures required for many different types of vehicle onboard sensors, it is necessary to first facilitating the placement of an observable target or calibration fixture 110 for a selected vehicle onboard sensor within a field of view for the selected sensor and at a location which is relative to the stationary vehicle 100. In a first embodiment illustrated with reference to the flowchart of FIG. 1, a procedure of the present disclosure for positioning such an observable target or calibration fixture 110 begins (Box 10) by operatively securing a laser emitter 102, or other optical beam projector, to a front wheel assembly 104 of a stationary vehicle 100 on the same lateral side as the field of view of the vehicle onboard sensor 202, such as a blind spot monitoring system sensor or other proximity sensor, to be adjusted. A beam projection axis X of the laser emitter is aligned to a known non-orthogonal orientation (Box 12) relative to a geometric reference associated with the vehicle, such as a center line or thrust line TL, such that the projection axis X is directed towards, and passes over, the placement location on the floor where the observable target or calibration fixture 110 is to be placed. The projection axis X is either inherently fixed to a proper orientation by design when the laser emitter or optical projector 102 is mounted to a vehicle wheel assembly 104 at a steered straight position, is adjusted to the proper orientation internally within the laser emitter or optical projector 102, or is adjusted to the proper orientation by guided steering of the vehicle wheel assembly 104 onto which the laser emitter or optical projector 102 is secured. As an alternative to securing the laser emitter or optical projector 102 to the vehicle wheel assembly 104, the laser emitter or optical projector 102 may be secured to a stationary surface of the vehicle 100 having a known position or orientation, such that the beam projection axis X is aligned towards the placement location for the observable target or calibration fixture 110 either inherently by design, or by subsequent adjustment within the laser emitter or optical projector 102.

Figure 4:
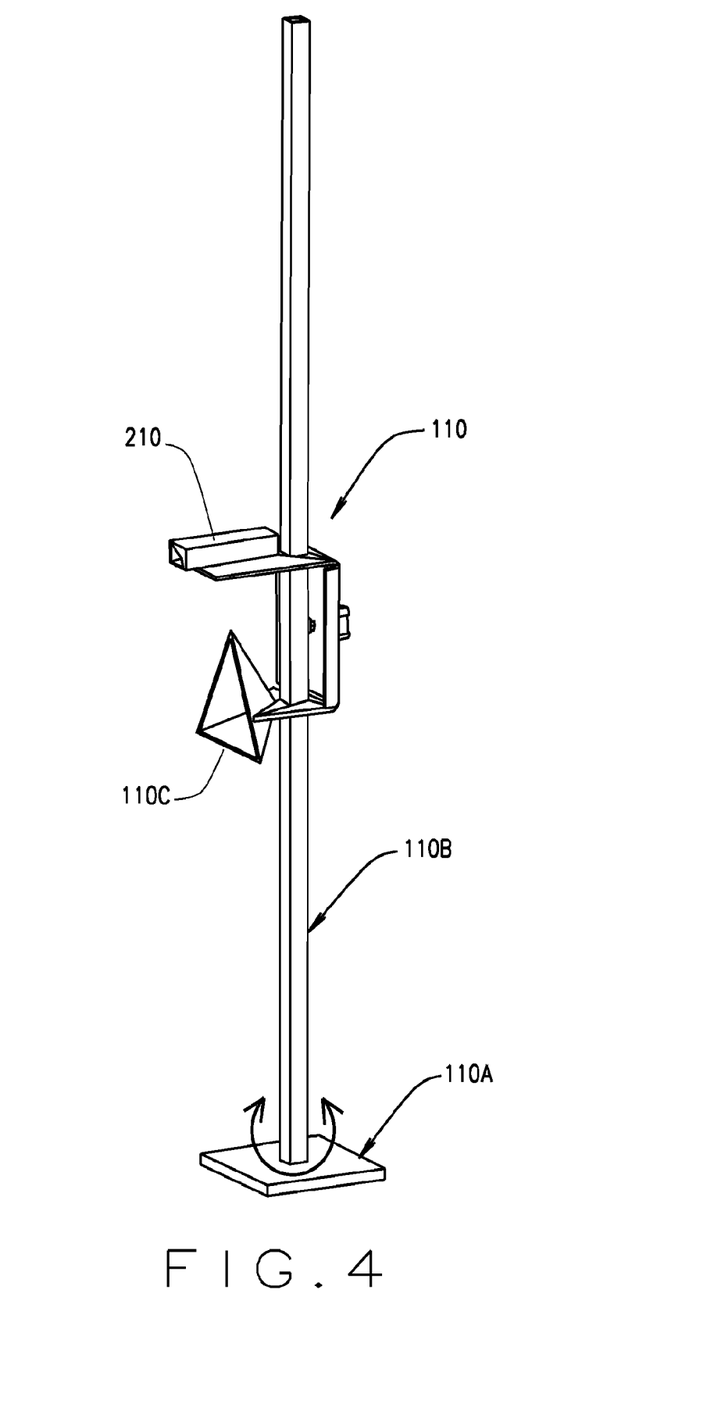
FIG. 4 is a perspective illustrations of an exemplary vehicle proximity sensor calibration fixture.

Once positioned, the beam projection axis X defines a placement axis along which the observable target or calibration fixture 110, such as shown in FIG. 4, is placed. The observable target or calibration fixture 110, consisting of a base 110A, a support stand 110B, and a reflector or target 1100 is then disposed at a position on the floor beneath the beam projection axis X (Box 14), oriented towards the vehicle onboard sensor 202, and within a field of view of the vehicle onboard sensor. The distance between the observable target or calibration fixture 110 and the vehicle onboard sensor 202, or another vehicle-based reference point, is measured and compared with a known distance requirement or specification (Box 16) defined by the vehicle manufacturer. If necessary, the position of the observable target or calibration fixture 110 along the beam projection axis X is adjusted to achieve the known distance requirement or specification. With the observable target or calibration fixture 110 positioned at the selected distance and appropriately orientated, a calibration or alignment of the vehicle onboard sensor 202 is evaluated and adjusted according to the manufacturer's specifications (Box 18).

Figure 2:
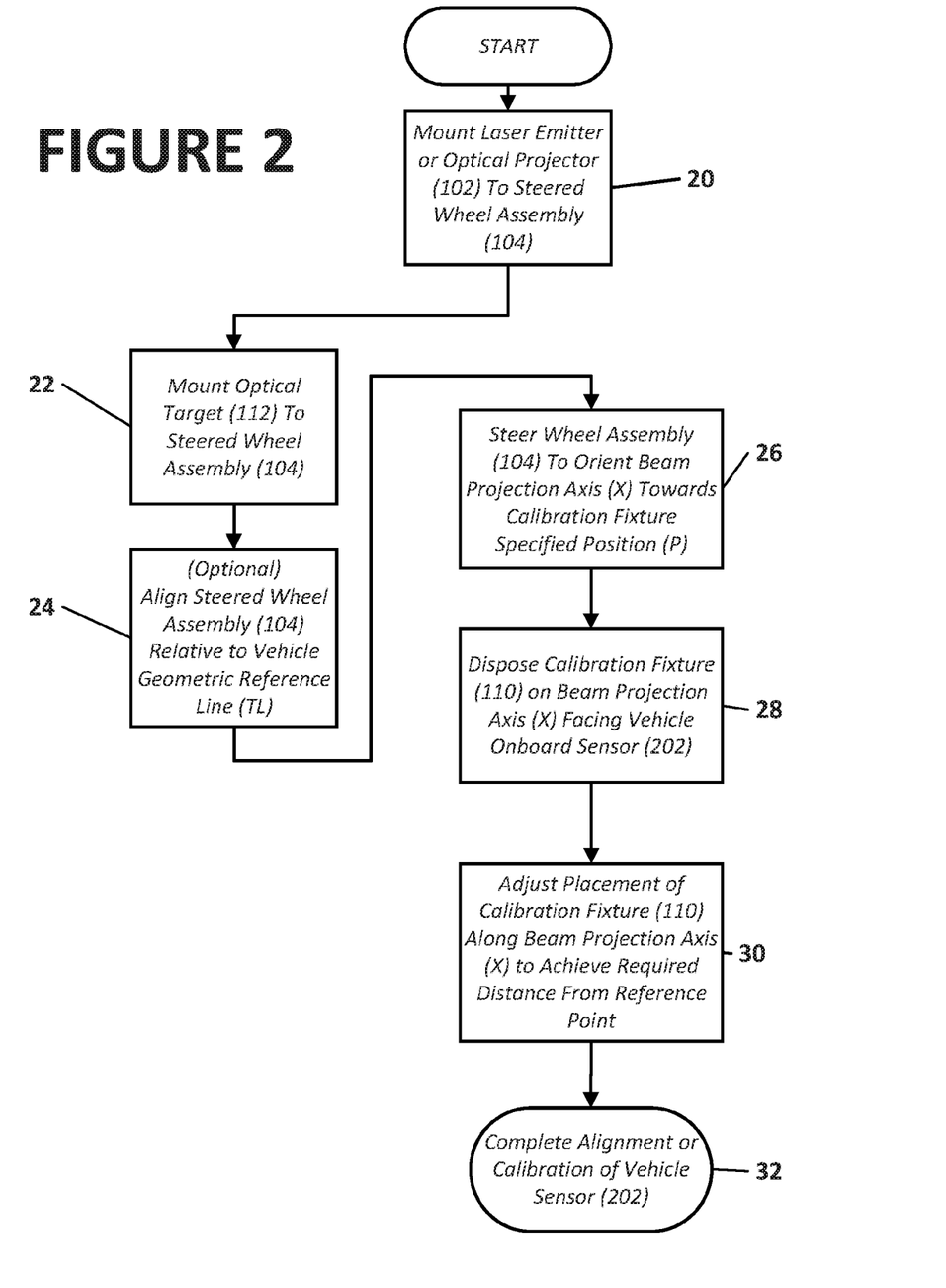
FIG. 2 is a flow chart illustration of further method of the present disclosure.

In a further method of the present disclosure, illustrated in the flowchart of FIG. 2, the laser emitter or optical projector 102 is operatively secured (Box 20) to the front steerable wheel assembly 104 of the vehicle 100, such that the beam projection axis X is oriented perpendicular to, or at a known or determined orientation relative to, a geometric reference of the vehicle 100 such as a center line or thrust line TL. A machine vision alignment system optical target 112 is additionally secured (Box 22) to the same steerable vehicle wheel assembly 104 by any suitable means, and observations of the optical target 112 by a machine vision vehicle wheel alignment system 200 are utilized to guide a steering movement of the steerable wheel assembly 104 (together with the secured laser emitter or optical projector 102) so as to align (Box 26) the beam projection axis X to pass over the placement location of the observable target or calibration fixture 110 for a vehicle onboard sensor 202, such as a blind spot monitoring system sensor or other proximity sensor. Preferably, the machine vision vehicle wheel alignment system 200 is utilized (Box 24) to align the steerable wheel assembly 104 relative to a geometric line of the vehicle 100 such as a center line or thrust line TL, prior to, or in lieu of, guiding the steering movement of the steerable wheel assembly 104 in order to align the beam projection axis X.

Once the beam projection axis X is aligned towards, and passes over, the placement location of the observable target or calibration fixture 110 on the floor, the procedure continues as previously described with the placement (Box 28) of the observable target or calibration fixture 110 on the floor surface along the beam projection axis X, with any adjustments to the placement position based upon measured distances between the observable target or calibration fixture 110 and a reference point on the vehicle (Box 30). Once the observable target or calibration fixture 110 is in the manufacturers specified position relative to the vehicle, a calibration or alignment of the vehicle onboard sensor can be completed per the manufacturer's specifications (Box 32).

Figure 3:
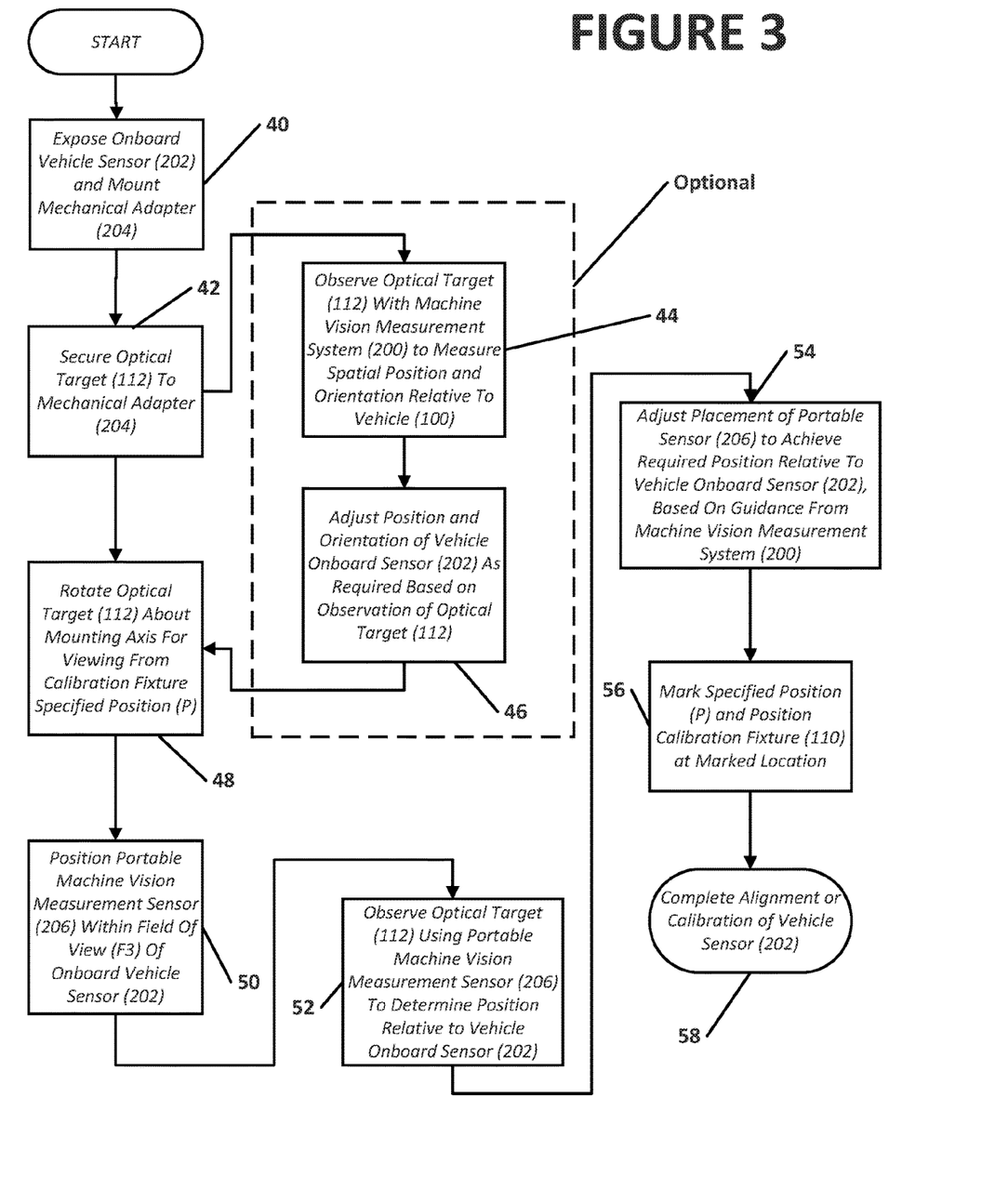
FIG. 3 is a flow chart illustration of another method of the present disclosure.
Figure 5A:
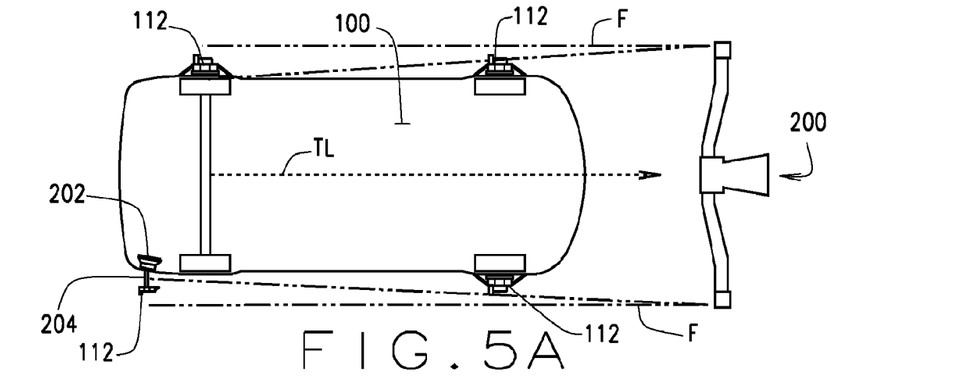
FIGS. 5A-5C illustrate a sequence of steps in a first exemplary procedure of the present disclosure for positioning a vehicle proximity sensor calibration fixture.
Figure 5B:
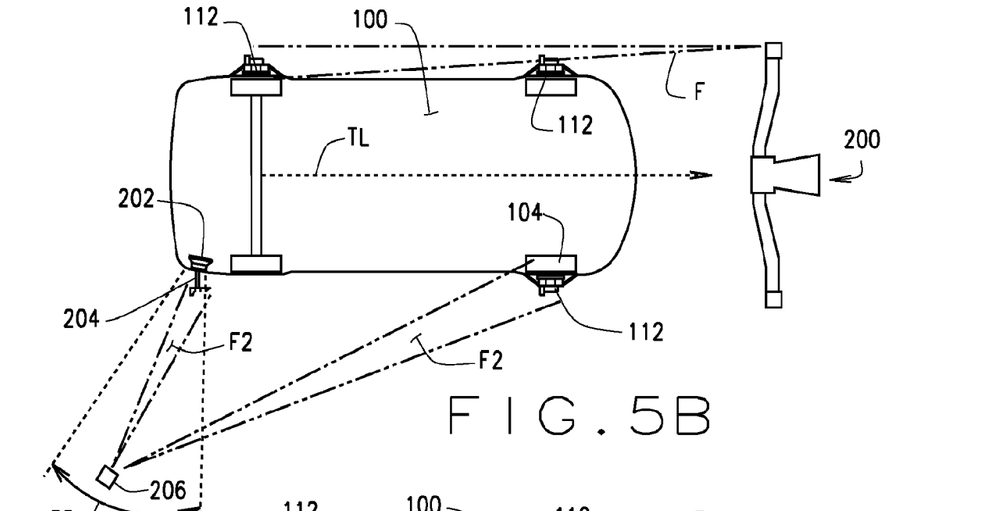
Figure 5C:
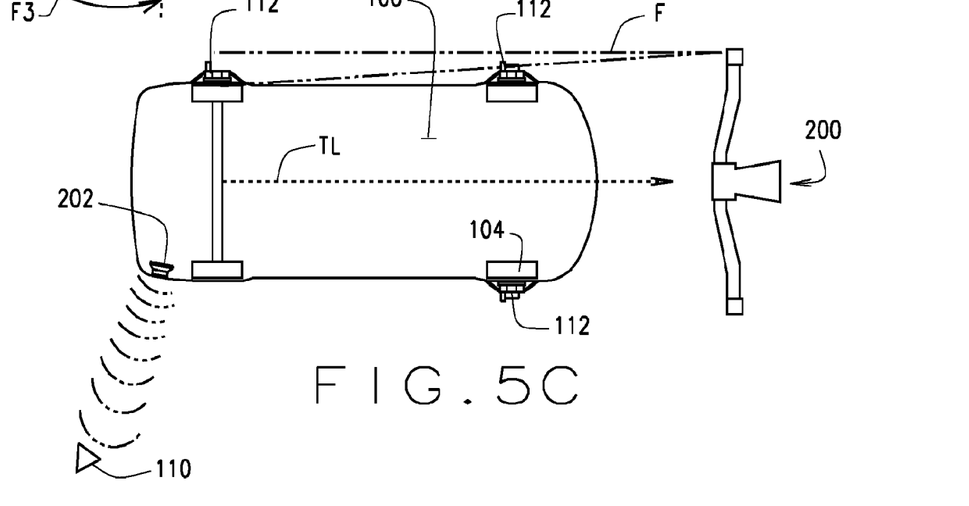

In an alternate method of the present disclosure illustrated by the flowchart of FIG. 3 and with reference to FIGS. 5A-5C, a machine vision vehicle wheel alignment system 200 is utilized to facilitate the measurement and adjustment of a vehicle onboard sensor 202, such as a blind spot monitoring system sensor or other proximity sensor. Initially, as seen in FIG. 5A, the vehicle onboard sensor is exposed by removing any necessary vehicle body components such as bumper covers, and a mechanical adapter 204 for receiving an optical target 112 is secured (Box 40) to the vehicle onboard sensor 202 or associated support brackets. The mechanical adapter 204 is configured to receive an optical target 112 (Box 42) which is pre-compensated relative to a mounting axis, and to hold the optical target 112 in a fixed relationship to the vehicle onboard sensor 202.

If the position or alignment of the vehicle onboard sensor 202 is to be adjusted relative to the vehicle prior to conducting a sensor calibration (Box 44, 46), the optical target 112 is positioned at an orientation which is visible within a field of view F of the machine vision vehicle wheel alignment system 200. The position and orientation of the optical target 112, and correspondingly the position and orientation of the vehicle onboard sensor 202 established from the fixed relationship, are measured (Box 44) by the machine vision vehicle wheel alignment system 200 together with a spatial and orientation reference to a known or measured feature of the vehicle, such as the vehicle center line or thrust line TL, following an alignment of the vehicle wheel assemblies. This information may be displayed to an operator in a variety of formats, such as, but not limited to, the use of bar-graph style representations of position and orientation. If necessary, corrections or adjustments to the vehicle onboard sensor 202 are made (Box 46) to ensure it is at a manufacturer specified position and orientation relative to the known or measured feature of the vehicle 100.

Those of ordinary skill in the art will understand that the steps of ensuring the vehicle onboard sensor 202 is at a manufacturer specified position and orientation relative to the known or measured feature of the vehicle (Box 44 and 46) may be optional if the service technician wishes to proceed directly with the placement (Box 50) of the calibration fixture 110 relative to a reference on the vehicle 100 other than the location of the vehicle onboard sensor 202 itself. Absent damage to the vehicle 100, it is unlikely that the vehicle onboard sensor 202 will be shifted sufficiently from the manufacturer specified position and orientation by an amount which will affect the calibration procedure.

Once the position and orientation of the vehicle onboard sensor 202 have been determined to be correct, either by measurement or assumption, the orientation of the optical target 112 is adjusted (if required) by rotation about the mounting axis 204 (Box 48), such that the optical target 204 is visible within the field of view F2 of a portable imaging sensor 206 disposed within the field of view F3 of the vehicle onboard sensor 202, as seen in FIG. 5B. The portable imaging sensor 206 enables the machine vision vehicle wheel alignment system 200 to obtain measurements of the relative position of the portable imaging sensor 206 to the optical target 112 secured to the vehicle onboard sensor 202 (Box 52). Guided by the obtained measurements, an operator is instructed to move the portable imaging sensor 206 to a location, relative to the optical target 112 and vehicle onboard sensor 202 or vehicle feature, which corresponds to a location specified by the vehicle manufacturer for placement of a calibration fixture (Box 54). The resulting location is noted or marked, and the portable imaging sensor 206 removed to permit placement of a calibration fixture 110 at the noted or marked location (Box 56) in order to complete a manufacturer specific calibration procedure for the vehicle onboard sensor 202 (Box 58, FIG. 5C). Optionally, the portable imaging sensor 206 may be disposed on a support structure of the calibration fixture 110 itself, and the two moved together, eliminating the need to note or mark the identified location prior to completing the manufacturer specific calibration procedures.

It will be recognized that as an alternative to placement of the optical target 112 on the vehicle onboard sensor or support bracket, the optical target 112 may be secured to another feature of the vehicle 100, such as the front steerable wheel assembly 104, for observation by the portable imaging sensor 206. So long as the location of the optical target relative 112 to the vehicle manufacturer's specified placement location for the calibration fixture 110 is known, the machine vision vehicle wheel alignment system 200 can utilize measurement obtained from images of the optical target 112 using the portable imaging sensor 206 to guide movement to the placement location.

Figure 6A:
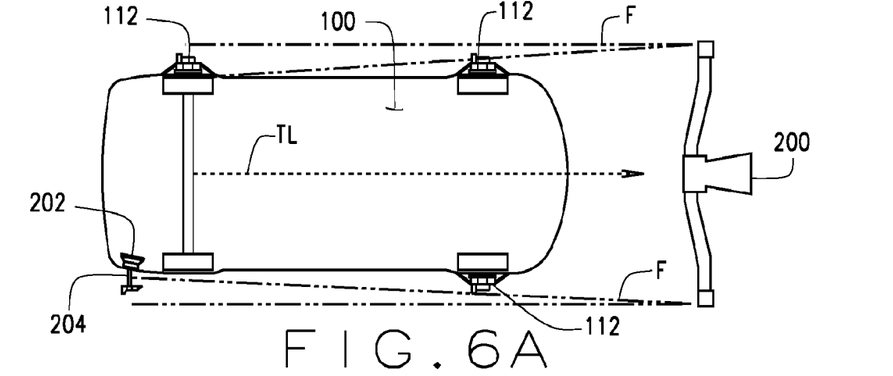
FIGS. 6A-6C illustrate a sequence of steps in a second exemplary procedure of the present disclosure for positioning a vehicle proximity sensor calibration fixture.

In an alternate embodiment illustrated in FIGS. 6-7, the position of the vehicle sensor 202 is initially verified as previously noted. As seen in FIG. 6A, the vehicle sensor 202 or support bracket is exposed, and the mechanical adapter 204 is secured thereto to receive the optical target 112 at a position within the field of view F of the machine vision vehicle wheel alignment system 200. The position and orientation of the optical target 112, and correspondingly the position and orientation of the vehicle onboard sensor 202 or associated mounting bracket established from the fixed relationship, are measured by the machine vision vehicle wheel alignment system 200 together with a spatial and orientation reference to a known or measured feature of the vehicle 100, such as the vehicle center line or thrust line TL.

Figure 7A:
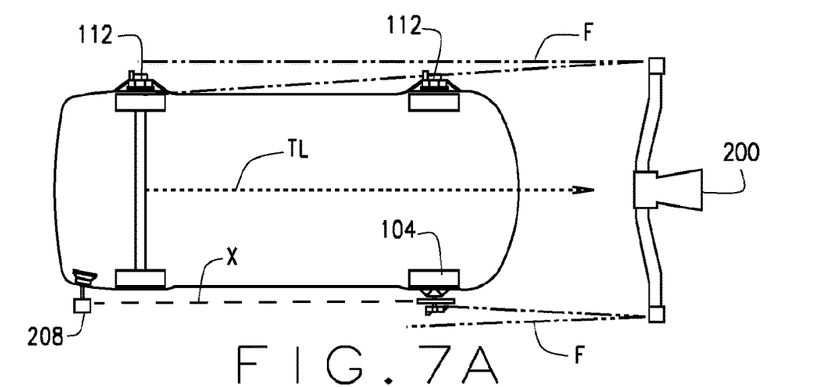
FIGS. 7A-7C illustrate a sequence of steps in a third exemplary procedure of the present disclosure for positioning a vehicle proximity sensor calibration fixture.

FIG. 7A illustrates an alternative procedure in which a reflective mirror surface 208 (or retro-reflective surface) is secured to the vehicle onboard sensor 202 or supporting bracket in place of the optical target 112, and used to reflect a laser beam back to a laser emitter 102 secured to the front wheel assembly 104 on the same lateral side of the vehicle 100. When the reflected laser light is aligned to within an acceptable tolerance to a predetermined point on the laser emitter 102 or adapter secured to the front wheel assembly 104, the vehicle onboard sensor 202 is deemed to be properly positioned and oriented for proceeding with a calibration using a properly positioned calibration fixture.

Figure 1:
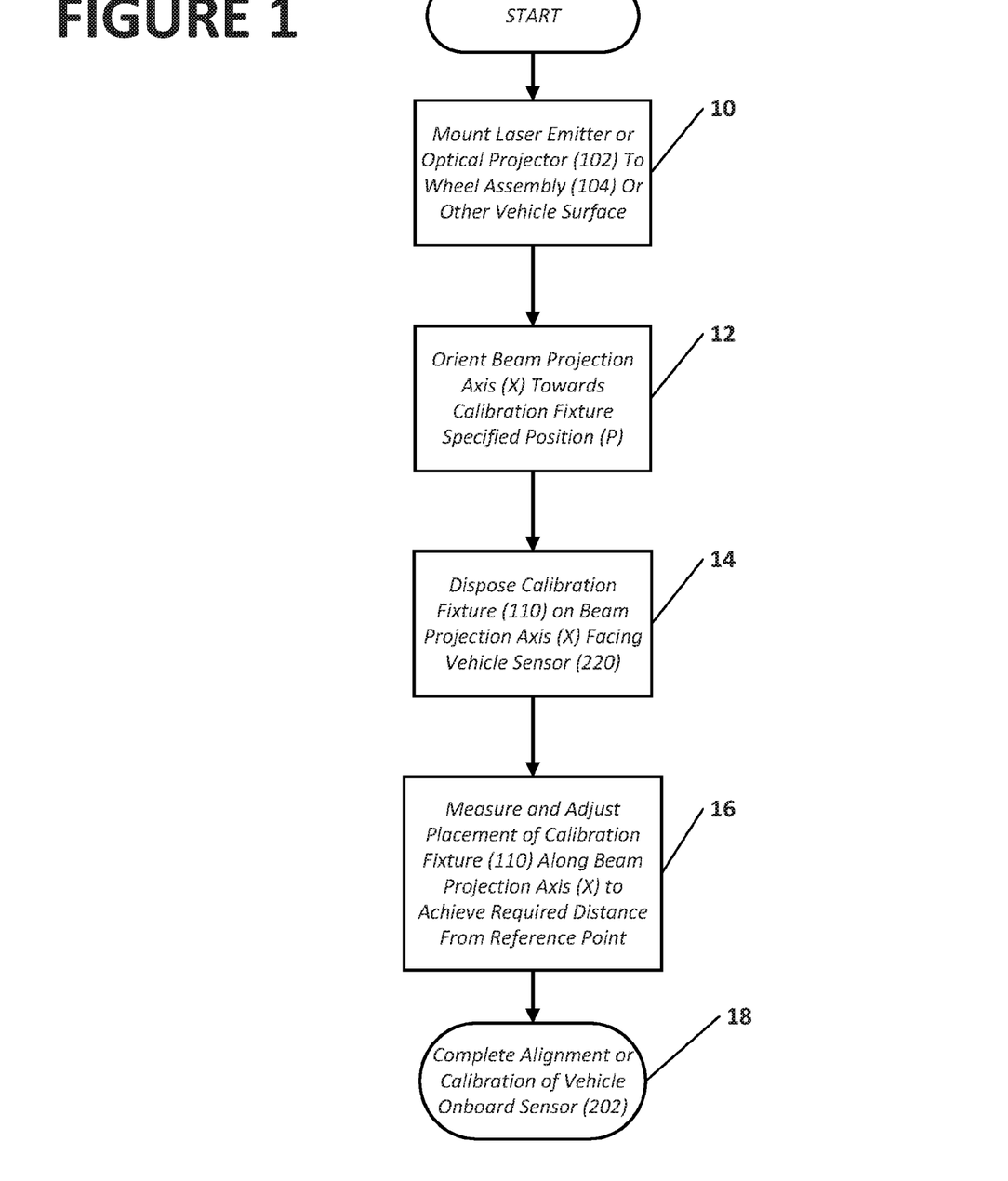
FIG. 1 is a flow chart illustration of a method of the present disclosure.
Figure 6B:
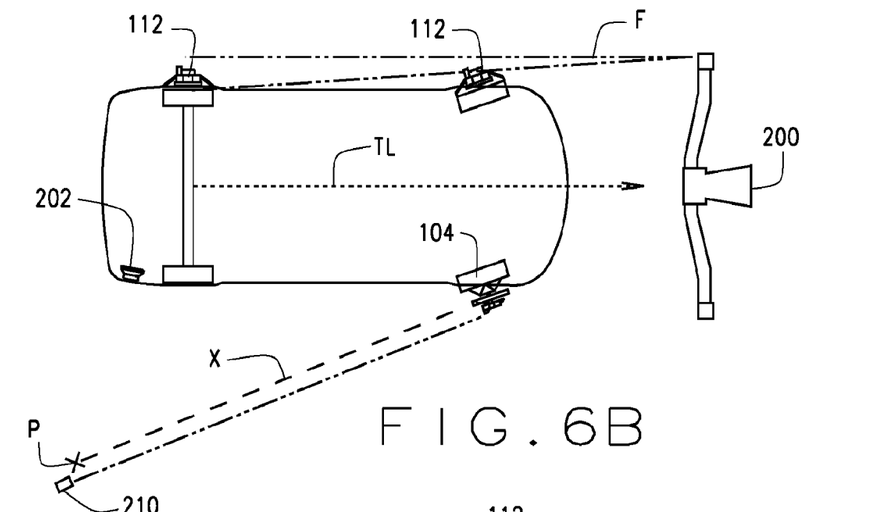
Figure 7B:
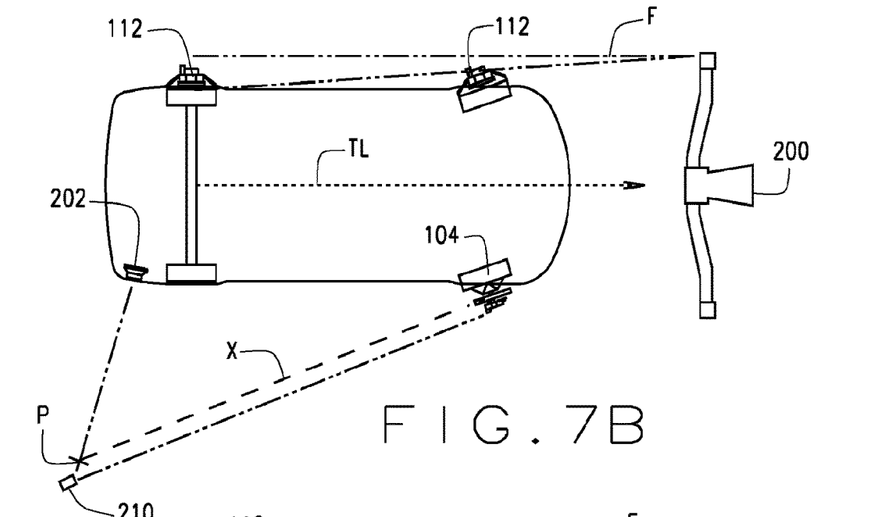

With the position and orientation of the vehicle onboard sensor 202 is determined to be correct, either by measurement or assumption, the procedure continues as previously described in connection with FIG. 1 and as shown in FIGS. 6B and 7B, by operatively securing a laser emitter or optical projector 102 to a front steerable wheel assembly 104 of the stationary vehicle 100 on the same lateral side as the field of view of the vehicle onboard sensor 202 to be aligned. A beam projection axis X of the laser emitter 102 is aligned to a known orientation relative to an axis of rotation for the front steerable wheel assembly 104, such that the beam projection axis X is directed towards, and passes over, the placement location P on the floor for the observable target or calibration fixture 110 either inherently by design, by adjustment within the laser emitter 102, or by guided steering of the front steerable wheel assembly 104.

Figure 6C:
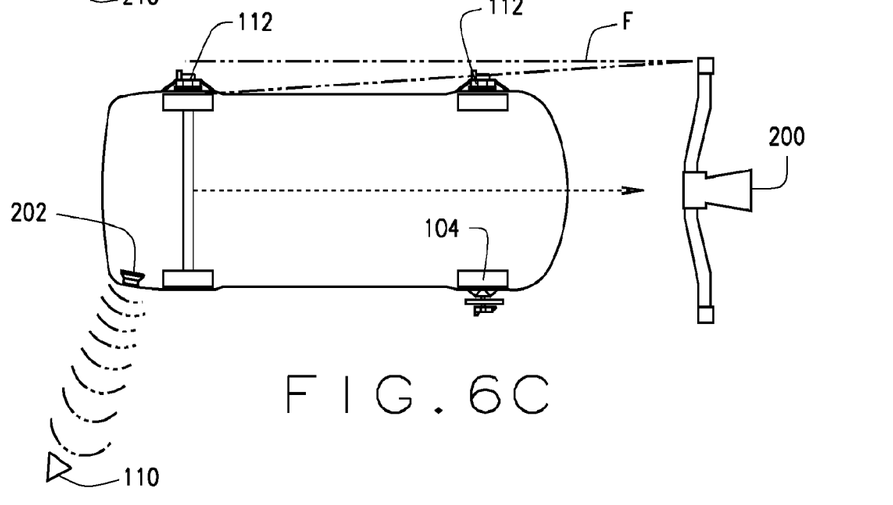
Figure 7C:
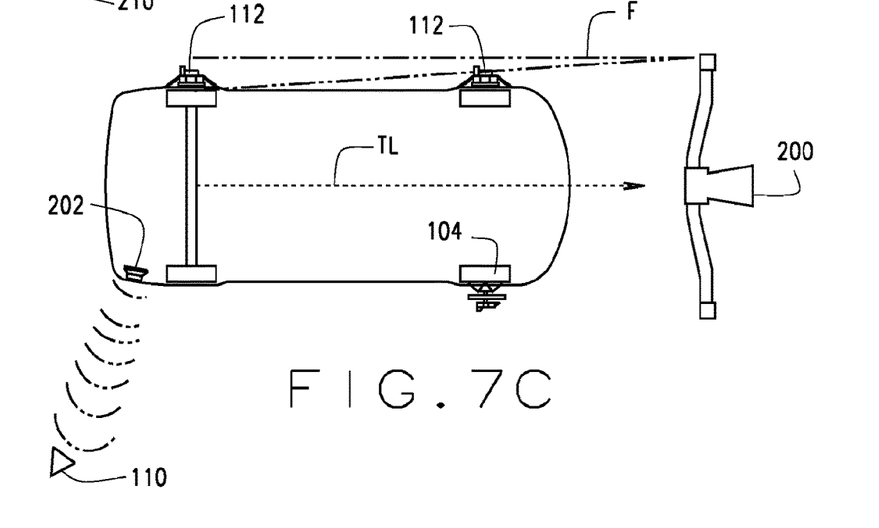

The beam projection axis X, once properly positioned, defines a placement axis along which the observable target or calibration fixture 110, such as shown in FIG. 4, will be located. The observable target or calibration fixture 110 is then disposed along the beam projection axis X, oriented towards the vehicle onboard sensor 202, and within a field of view of the vehicle onboard sensor 202. The distance between the observable target or calibration fixture 110 and the vehicle onboard sensor 202, laser projector 102, or other vehicle-based reference point, such as the optical target 112 on the front steerable wheel assembly 104 is measured using a displacement sensor 210 or other suitable linear distance measurement tool, and compared with a known distance requirements or specifications. If necessary, the position of the observable target or calibration fixture 110 along the beam projection axis X is adjusted to match the known distance requirement or specification. With the observable target or calibration fixture 110 positioned along the beam projection axis, at the selected distance, and appropriately orientated, the calibration fixture 110 is observed by the vehicle onboard sensor 202, and calibration or alignment of the vehicle onboard sensor 202 is evaluated and adjusted according to the manufacturer's specifications (FIGS. 6C and 7C).

The present disclosure further sets forth an apparatus configured to facilitate the proper positioning on a portable observable target or calibration fixture 110 associated with the alignment or calibration of a vehicle onboard sensor 202, such as a vehicle blind spot monitoring system sensor or proximity sensor. The apparatus consists of a laser emitter or optical projector 102 adapted to be secured to a surface of the vehicle 100, such as a wheel assembly 104, in a fixed or determinable orientation, in combination with a distance measurement 210 device configured to be coupled to a portable observable target or calibration fixture 110 as shown in FIG. 4. The laser emitter or optical projector generates a beam of light defining a beam projection axis X over the floor surface in proximity to the vehicle 100, along which the portable observable target or calibration fixture 110 is disposed within a field of view of the vehicle onboard sensor 202. A suitable laser emitter or optical projector 102 is shown in U.S. Patent Application Publication No. 2013-0110314 A1, herein incorporated by reference. The distance measurement device 210 is configured to measure or indicate a distance between the portable observable target or calibration fixture 110 and the vehicle onboard sensor 202 or other established reference point on the vehicle 100, such as an optical target 112 secured to a front steerable wheel assembly 104 of the vehicle 100, enabling a determination of the proper floor location for placement of the calibration fixture 110 along the beam projection axis X. An exemplary distance measurement device 210 may be optical or acoustical in nature, such as a laser displacement sensor, or may be mechanical, such as a simple tape measure. Any distance measurement device capable of measuring a distance from the portable observable target or calibration fixture 110 to an identified reference point associated with the vehicle 100 with sufficient accuracy as required by the vehicle manufacturer specification may be utilized without departing from the scope of the present disclosure.

Those of ordinary skill will recognize while several of the embodiments described herein utilize a laser emitter, any suitable means for projecting an identifiable reference along a straight path may be utilized, including, but not limited to point-source LED illumination or a light source with a focusing lens assembly.

If will additionally be recognized by those of ordinary skill in the art that a number of the embodiments described herein utilizing a camera and optical target, or a projector and retro-reflector, mirror, or target combination may be implemented with the camera and target, or projector and retro-reflector, mirror or target disposed in an optically opposite configuration from that which is shown and described within the context of the present invention. For example, as shown in FIG. 5B, the portable camera or imaging sensor 206 could alternatively be secured to the mounting of the vehicle onboard sensor 202, and used to observe a portable optical target (not shown) within the field of view, to guide positioning of the portable optical target to a specific location P at which a calibration fixture 110 is to be placed. Similarly, the locations of the liner distance measurement device illustrated in FIGS. 6B and 7B could be moved from the calibration fixture 110 to a mounting location on the front steerable vehicle wheel assembly 104, and utilized to determine a distance from the wheel assembly 104 to the portable calibration fixture 110 along the beam placement axis X. As a further example, the laser emitter 102 could be placed on the calibration fixture 110, and oriented towards a mirror or retro-reflector (not shown) disposed on the front steerable wheel assembly 104 of the vehicle 100. With the mirror or retro-reflector aligned either directly or by steering movement of the front steerable wheel assembly 104 to reflect an incident light beam along the beam projection axis X relative to a geometric reference associated with the vehicle 100, such as a center line or thrust line TL, the calibration fixture 110 can be positioned such that the reflected light beam intersects a reference feature on the calibration fixture when the calibration fixture is disposed along the beam projection axis X.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

For example, a machine vision vehicle service system of the present disclosure, having a suitably configured processing system, may be configured to position a calibration fixture 110 relative to a vehicle 100 during a vehicle service procedure with at least an imaging system 200 having a field of view F encompassing at least a portion of said vehicle 100 having a front steerable wheel assembly 104; a mounting adapter configured for attachment to said front wheel assembly 104; a laser emitter 102 secured to said mounting adapter, said laser emitter configured to project an illuminating beam along a beam projection axis X; an optical target 112 further secured to said mounting adapter, said optical target observable by said imaging system 200 within said field of view F; and wherein the processing system configured with a set of instruction to receive image of said optical target 112 from said imaging system 200, and to evaluate said received images to guide a steering movement of said front wheel assembly 104 such that said beam projection axis X is aligned with a specified placement location for said calibration fixture 110 on a floor surface within a field of view F3 of a vehicle onboard sensor 202.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for positioning a calibration fixture 110 relative to a vehicle 100 during a vehicle service procedure, comprising:

establishing a placement axis X along which said calibration fixture 110 is to be positioned, said placement axis X aligned relative to a feature of the vehicle 100;

projecting an illuminating beam of light along said established placement axis X;

identifying a location P adjacent a lateral side of said vehicle at a specified distance along said illuminated placement axis X from a known reference point associated with the vehicle 100; and disposing said calibration fixture 110 at said identified location P for calibration of a blind spot monitoring sensor 202 having a field of view encompassing said location P.

2. The method of claim 1 wherein projecting said illuminating beam includes coupling an optical projector 102 to a surface of the vehicle 100;

orienting a projection axis of said optical projector 102 into alignment with said established placement axis X; and projecting, from said optical projector 102, said illuminating beam of light along said established placement axis X to guide disposition of said calibration fixture 110 along said axis X.

3. The method of claim 1 wherein projecting said illuminating beam includes coupling an optical projector 102 to said calibration fixture 110;

projecting, from said optical projector 102, said illuminating beam of light; and retro-reflecting said projected illuminating beam of light from a mirror coupled to a front steerable wheel assembly 104 of the vehicle 100 when said calibration fixture 110 is disposed on said established placement axis X and said projected illuminating beam of light is aligned with said established placement axis X.

4. The method of claim 2 wherein said surface of the vehicle is a front steerable wheel assembly 104 of the vehicle 100;
- wherein orienting said projection axis includes steering said front steerable wheel assembly to align said illuminating beam of light with said established projection axis X; and
- wherein said established projection axis X is at an angle relative to both a centerline and a thrust line TL of the vehicle 100.

5. The method of claim 1 wherein said reference point is associated with one of either a vehicle centerline or a vehicle thrust line TL.

6. A method for facilitating service of a vehicle onboard sensor 202 having a field of view F3 external to a lateral side of a vehicle 100, comprising:
- disposing a portable imaging sensor 206 on a floor within said field of view F3 of the vehicle onboard sensor, said portable imaging sensor 206 in operative communication with said machine vision vehicle wheel alignment system 200;
- observing a reference target on said vehicle 100 with the portable imaging sensor 206;
- utilizing said observations of the reference target by the portable imaging sensor 206 to determine a relative position of the portable imaging sensor 206, and to adjust positioning of the portable imaging sensor 206 within said field of view F3 to a calibration position P on said floor;
- placing a calibration fixture 110 for said vehicle onboard sensor adjacent said lateral side of said vehicle at said calibration position P; and
- calibrating said vehicle onboard sensor 202 using observations of said calibration fixture 110 placed at said calibration position P.

7. The method of claim 6 further including evaluating a position and orientation of the vehicle onboard sensor 202 prior to disposing said portable imaging sensor 206 within said field of view F3.

8. The method of claim 7 wherein evaluating said position and orientation of the vehicle onboard sensor 202 includes
- securing an optical target 112 to said vehicle onboard sensor 202;
- aligning said optical target 112 to be visible within a field of view F of a machine vision vehicle wheel alignment system 200;
- observing the optical target 112 with the machine vision vehicle wheel alignment system 200 to determine a position and orientation of the optical target 112 relative to either a centerline or a thrust line TL of the vehicle 100; and
- altering at least one of a position and an orientation of the vehicle onboard sensor 202 responsive to said observation of the optical target 112 identifying a deviation in said determined position or orientation from an established set of specifications for the vehicle onboard sensor 202.

9. The method of claim 6 wherein said portable imaging sensor 206 is coupled to said calibration fixture 110, such that said step of utilizing said observation to adjust position of the portable imaging sensor 206 concurrently places said calibration fixture 110 at said calibration position P.

10. A machine vision vehicle service system configured to position a calibration fixture relative to a blind spot monitoring sensor onboard a vehicle during a vehicle service procedure, comprising:
- an imaging system having a field of view encompassing at least a portion of said vehicle having a front steerable wheel assembly;
- a mounting adapter configured for attachment to said front wheel assembly;
- an optical projector secured to said mounting adapter, said optical projector configured to project an illuminating beam along a beam projection axis;
- an optical target further secured to said mounting adapter, said optical target observable by said imaging system within said field of view; and
- a processing system configured with a set of instruction to receive image of said optical target from said imaging system, and to evaluate said received images to guide a steering movement of said front wheel assembly such that said beam projection axis is aligned with a specified placement location for said calibration fixture on a floor surface adjacent a lateral side of said vehicle and within an operative field of view of said vehicle onboard blind spot monitoring sensor.

* * * * *